United States Patent [19]

Hayton et al.

[11] Patent Number: 4,651,364
[45] Date of Patent: Mar. 24, 1987

[54] X-RAY CASSETTE HOLDER FOR A TRAUMA STRETCHER

[75] Inventors: Eugene P. Hayton, Medina; Gerald Peters, Elyria; Raymond A. Failor, Seville, all of Ohio

[73] Assignee: Simmons Universal Corporation, New York, N.Y.

[21] Appl. No.: 867,861

[22] Filed: May 28, 1986

[51] Int. Cl.⁴ ................. A47C 19/02; A61G 7/06; G03B 41/18
[52] U.S. Cl. ......................... 5/60; 5/81 R; 5/82 R; 378/177; 378/178; 378/179; 378/180
[58] Field of Search ............... 5/60, 81 R, 82 R, 86; 378/177, 178, 179, 180, 181, 182

[56] References Cited

U.S. PATENT DOCUMENTS

| | | | |
|---|---|---|---|
| 1,426,899 | 8/1922 | Mutscheller | 378/177 X |
| 2,049,271 | 7/1936 | Nelson | 378/179 X |
| 2,989,634 | 6/1961 | Ould et al. | 378/177 |
| 3,763,375 | 10/1973 | Scheninger | 378/177 |
| 3,904,531 | 9/1975 | Barret et al. | 378/177 X |
| 4,084,277 | 4/1978 | Conrad et al. | 5/430 |
| 4,160,912 | 7/1979 | Hogan | 378/177 X |
| 4,193,148 | 3/1980 | Rush | 5/82 R X |
| 4,197,465 | 4/1980 | Schneider | 378/177 X |
| 4,232,227 | 11/1980 | Finkenzeller et al. | 378/177 |
| 4,416,020 | 11/1983 | Wagner et al. | 378/177 X |

Primary Examiner—Thomas J. Holko
Assistant Examiner—Carl M. DeFranco, Jr.
Attorney, Agent, or Firm—A. Thomas Kammer

[57] ABSTRACT

A cassette holder is provided for use with a wheeled stretcher or the like. The holder is slidably and pivotably mounted to a pair of support tubes positioned beneath the top board of the stretcher. It may accordingly be positioned beneath any portion of the top board which is desired. To replace an x-ray or other type of film cassette, the holder may be pivoted downwardly towards either side of the stretcher. A tray slides out from the holder to provide easy access to the cassette. The holder accepts cassettes from both sides of the stretcher depending upon which support tube is utilized as a pivot axis.

20 Claims, 9 Drawing Figures

X-RAY CASSETTE HOLDER FOR A TRAUMA STRETCHER

BACKGROUND OF THE INVENTION

1. Field of the Invention

The field of the invention relates to cassette holders for use in conjunction with trauma stretchers, x-ray tables and the like.

2. Brief Description of the Prior Art

It is often desirable to avoid moving a patient from a transport apparatus to an x-ray table to provide maximum safety, particularly in cases of trauma, severe fractures or when internal injury is suspected. Wheeled stretchers have accordingly been designed to allow x-rays of the patient to be taken while he rests upon the stretcher.

In one prior art unit, a cassette carrier is provided which may slide the entire length of the stretcher through the use of a tracking system including roller bearings. A film cassette may be loaded into the carrier from the head end by raising the head support surface and placing it on a loader tray within the carrier. Alternatively, the cassette can be loaded from either side of the stretcher. The loader tray includes a pair of opposing, pivotably mounted arms which are used to pull it from the carrier. The arm on one side of the tray is pivoted upwardly when the tray is in the loading position. This allows the cassette (and cassette adapter, if necessary) to slide into place.

U.S. Pat. Nos. 2,989,634, 3,997,792 and 4,193,148 disclose various types of film cassette holders which are employed in conjunction with wheeled stretchers or other patient support means.

SUMMARY OF THE INVENTION

A film cassette holder is provided for use in conjunction with wheeled stretchers or other patient support apparatus. The holder includes a frame, a pair of pivot arms secured to opposite sides of the frame, and a loading tray slidably mounted to the frame. Each pivot arm includes a glide member. The glide members may be secured to a pair of parallel support members attached to the support apparatus. The cassette holder may slide along the support members or pivot about the axis of either support member. The latter function facilitates loading or unloading of a film cassette within the tray.

DETAILED DESCRIPTION OF THE INVENTION

Figure 1:
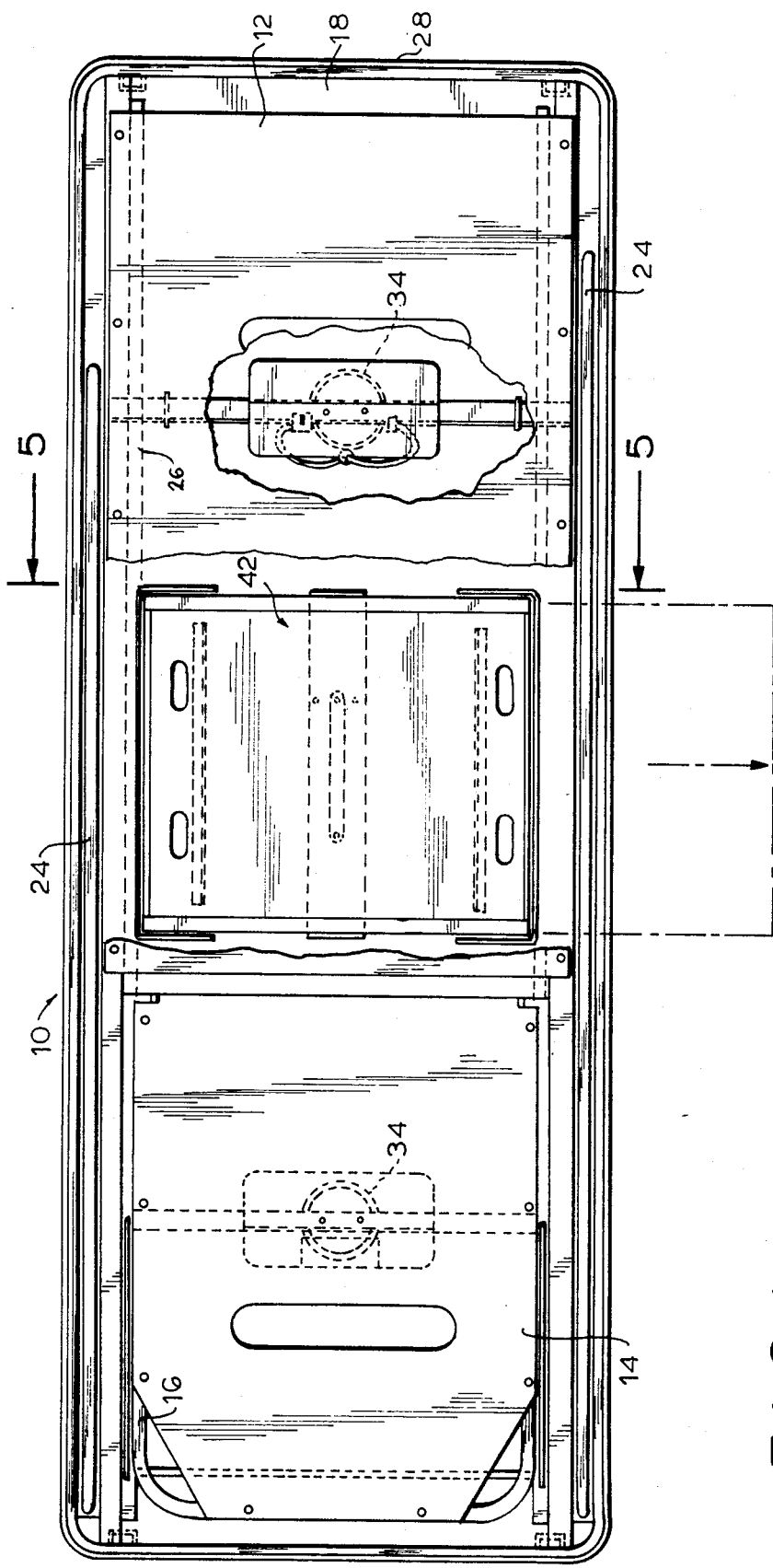
FIG. 1 is a partially cutaway top plan view of a wheeled stretcher according to the invention.
Figure 2:
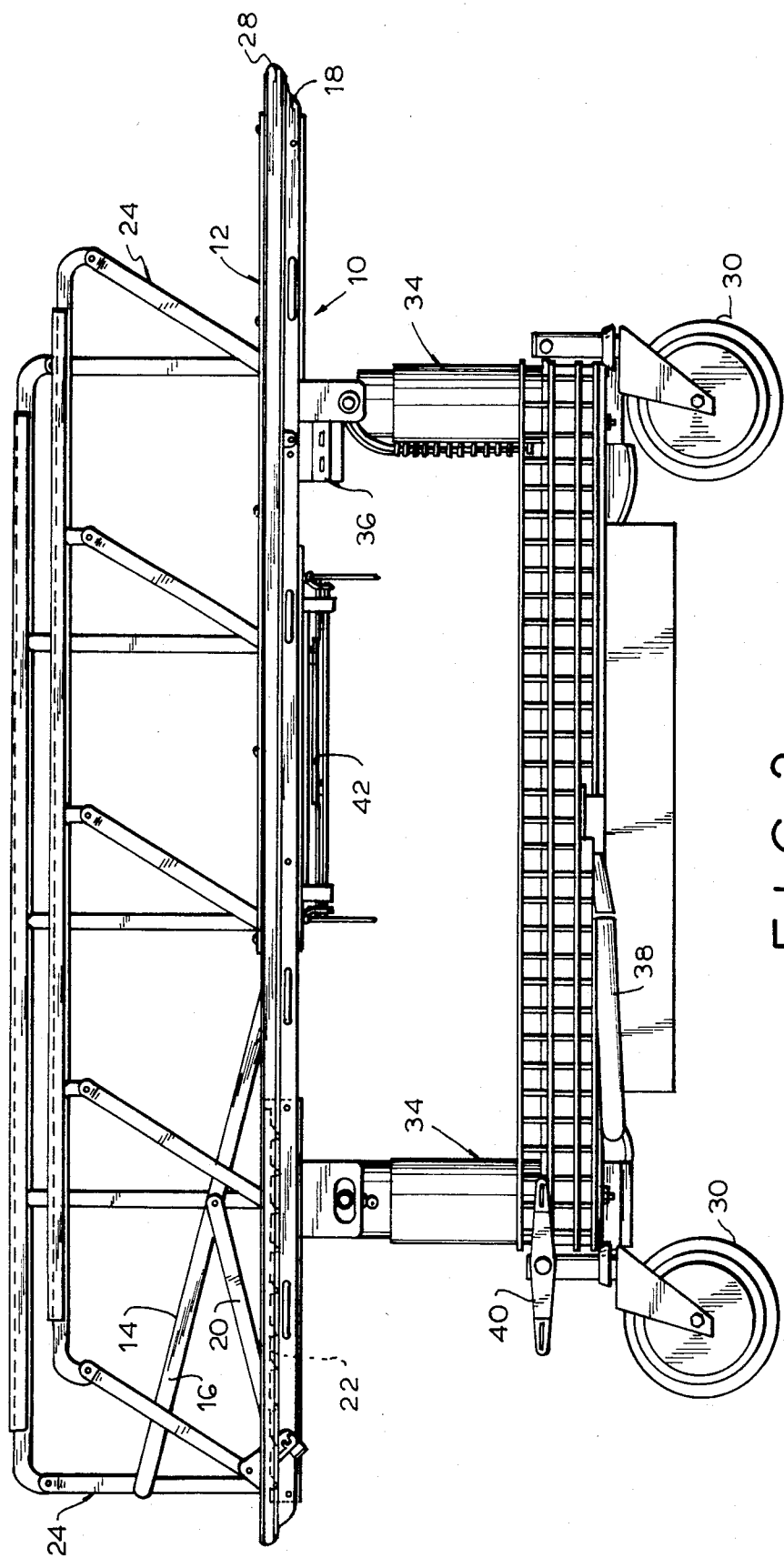
FIG. 2 is a side elevation view thereof.

A wheeled stretcher 10 which allows full body length X-rays of a patient is shown in FIGS. 1 and 2. The stretcher may incorporate control mechanisms as disclosed in U.S. Pat. No. 4,489,449 which is incorporated by reference herein.

The stretcher include a radiolucent top 12 having an adjustable backrest 14 shown in a raised position in FIG. 2. The backrest is supported by a tubular frame 16 pivotably mounted to a frame assembly 18 defining the top of the stretcher. A U-shaped brace 20 is pivotably secured to the frame 16 at one end while its other end is engaged by a selected pair of opposing notches within a pair of notched, elongate plates 22. The frame assembly 18 also supports a pair of self-storing side rails 24 and a pair of substantially parallel, tubular support members 26. A full perimeter protective rubber bumper 28 is secured to the outer surface of the frame assembly 18.

The base of the stretcher 10 includes four caster wheels 30, a pair of utility baskets 32 and a pair of hydraulic piston/cylinder assemblies 34. Push button controls 36 and a pair of foot pedals 38 are provided for making height adjustments. Foot operated brake controls 40 are provided to allow brake means (not shown) to be applied by an attendant to one or more of the caster wheels.

A cassette holder 42 as shown in FIGS. 3–6 is mounted to the support members 26 to allow full body length X-rays to be taken without moving a patient from the stretcher. The holder 42 includes a frame 44 defined by a pair of parallel channel members 46, each having a U-shaped cross-section, and a U-shaped cross brace 48. The members 46 each define a channel 50 within which a loading tray 52 is slidably positioned. The channels are, of course, in opposing relation to each other.

A swivel arm 54 is pivotably mounted near one end to the cross brace 48. The other and includes an upwardly extending hinge pin 56 which abuts one of two angle stop members 58 secured to the bottom of the tray 52 when the tray is moved to its outer limits with respect to the frame 44. A pair of openings 60 are provided at each end of the tray 52 to allow a attendant to reach under the tray and lift a film cassette with his finger tips.

A pair of upwardly extending pins 61 secured to the cross brace 48 prevent the swivel arm from being moved to a position parallel to the channel members where it would cause difficulty in moving the tray back within the frame 44.

A pair of U-shaped pivot arms 62 are respectively secured near the opposing ends of the channel members 46. Each pivot arm includes a pair of parallel arm portions 62a which extend perpendicularly from an integral conncting member 62b. An elongate slot 64 is defined within each arm portion. Pivot pins 66 secured to the channel members 46 extend through each slot 64 and connect the pivot arms to the frame 44. A nut is secured to the end of each pin.

A pair of extruded nylon glide members 68 are riveted to each connecting member 62b of the pivot arms. The glide members each include a C-shaped opening which engages one of the support members 26. This enables the cassette holder 42 to be moved longitudinally to any desired position beneath the radiolucent top of the stretcher by pushing or pulling one of four handles handes 70 mounted to the frame 44. It also allows the cassette holder to be pivoted about the axis of either support member.

Figure 3:
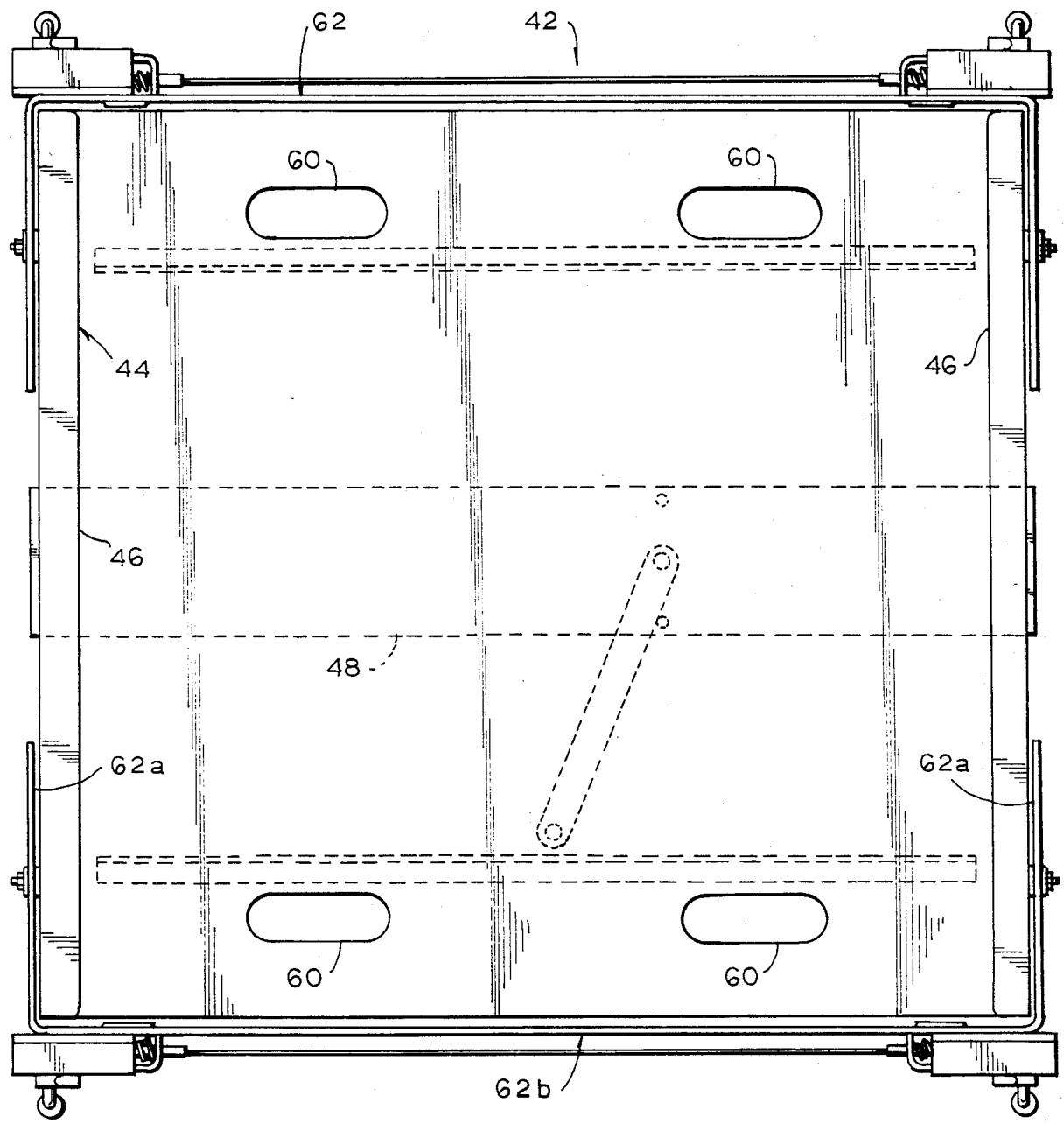
FIG. 3 is a top plan view of a cassette holder according to the invention.
Figure 4:
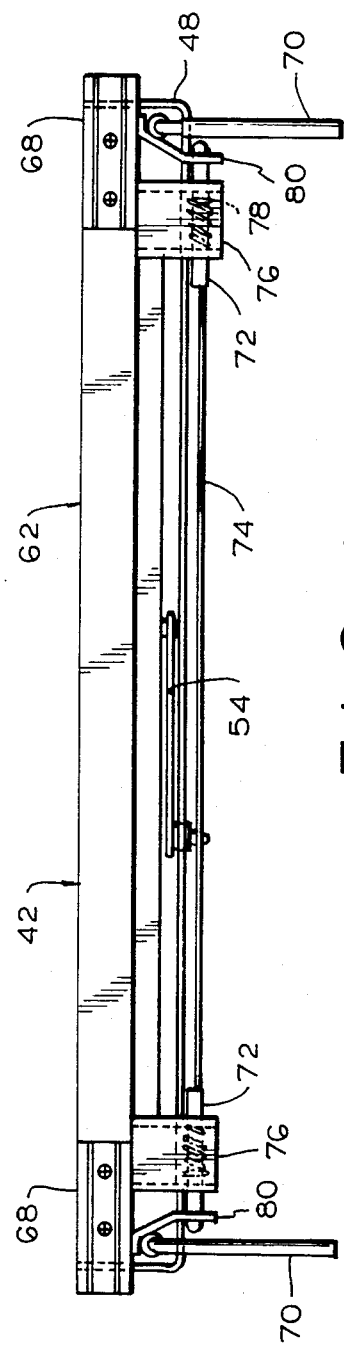
FIG. 4 is an end view thereof.
Figure 5:
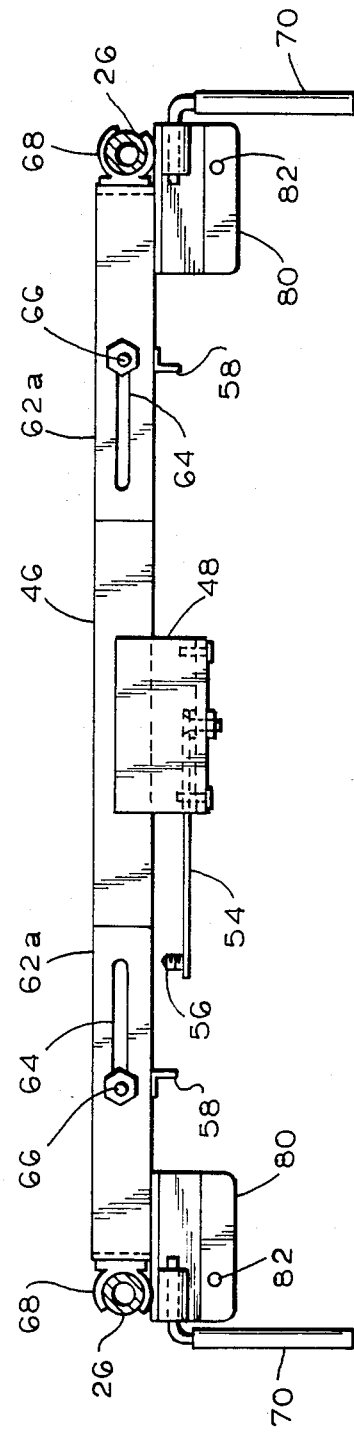
FIG. 5 is a side elevation view thereof.
Figure 6:
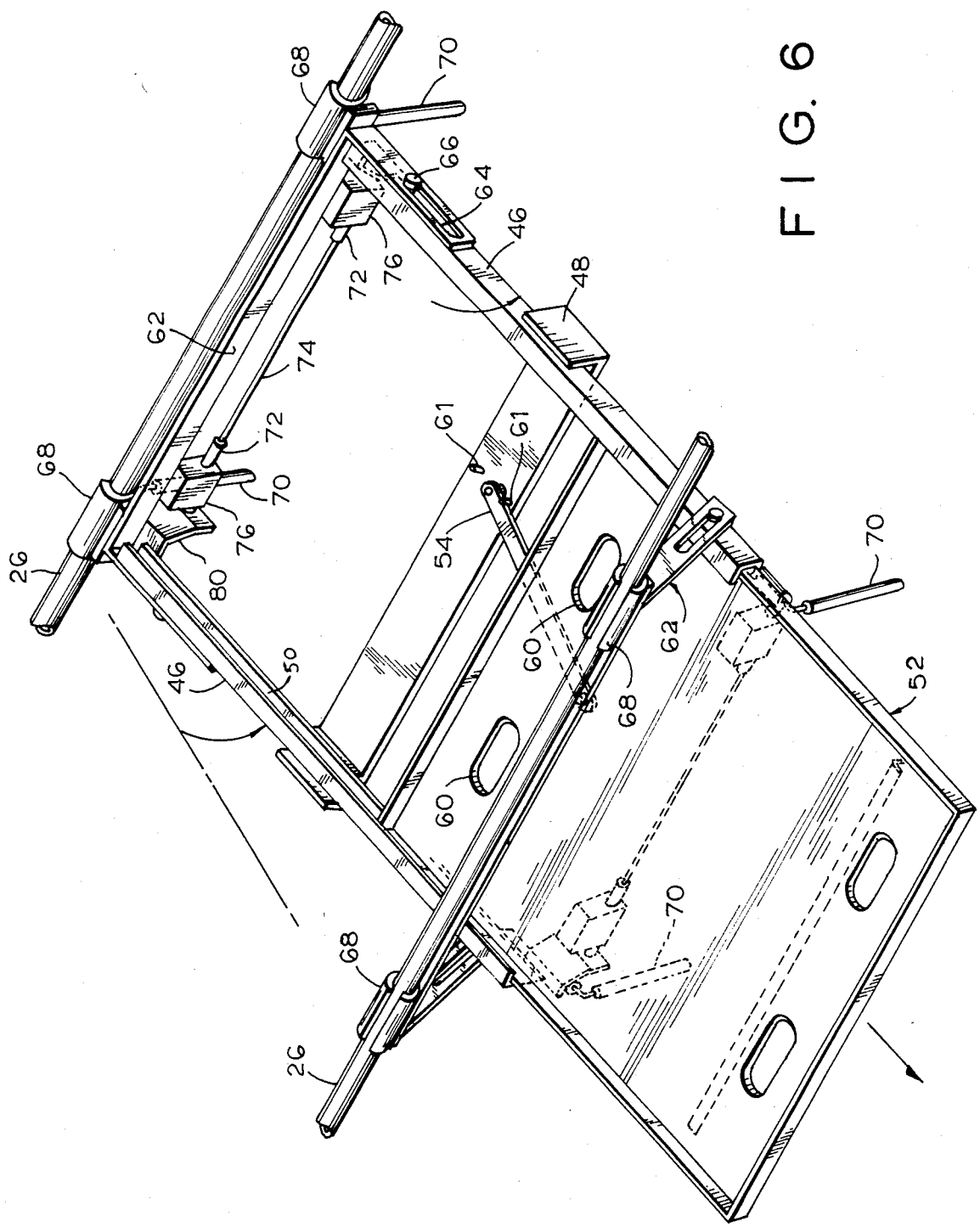
FIG. 6 is a perspective view of a cassette holder secured to a pair of support members on a wheeled stretcher.

Referring to FIGS. 3, 4 and 6, a pair of spring-loaded latch mechanisms are provided for controlling the angular orientation of the cassette holder 42. Each mechanism includes a pair of spring-loaded pins 72 secured to a cable 74. The pins are each permanently positioned within respective housings 76 secured to each pivot arm 62. A coil spring 78 resiliently urges each pin towards respective brackets 80 attached to the frame 44. Each bracket includes an opening 82 for receiving a pin. When a set of pins extend respectively within the openings of a pair of opposing brackets as shown in FIG. 4, the pivot arm will be maintained in the same plane as the frame 44. If the cable 74 is pulled such that the pins are released from the brackets 80, the pivot arm is free to move about the axis of the pivot pins 66 which secure it to the frame 44.

Figure 7:
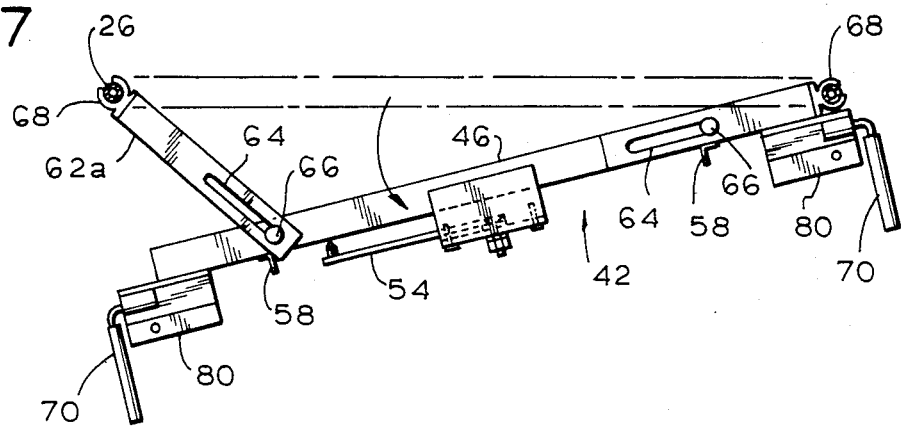
FIG. 7 is an enlarged side elevation view of the cassette holder in a first position with respect to the support members.
Figure 8:
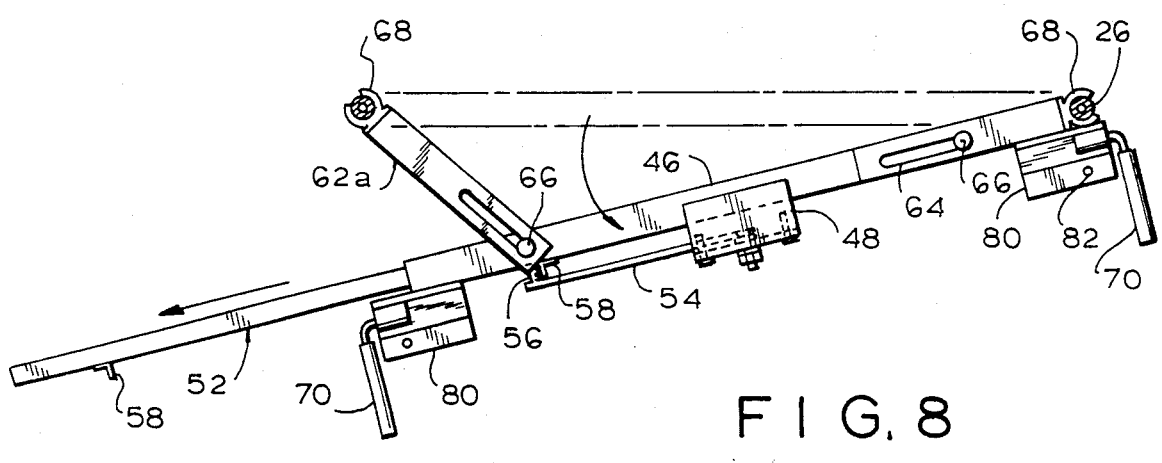
FIG. 8 is the same view as FIG. 7 but showing the tray in the loading position.
Figure 9:
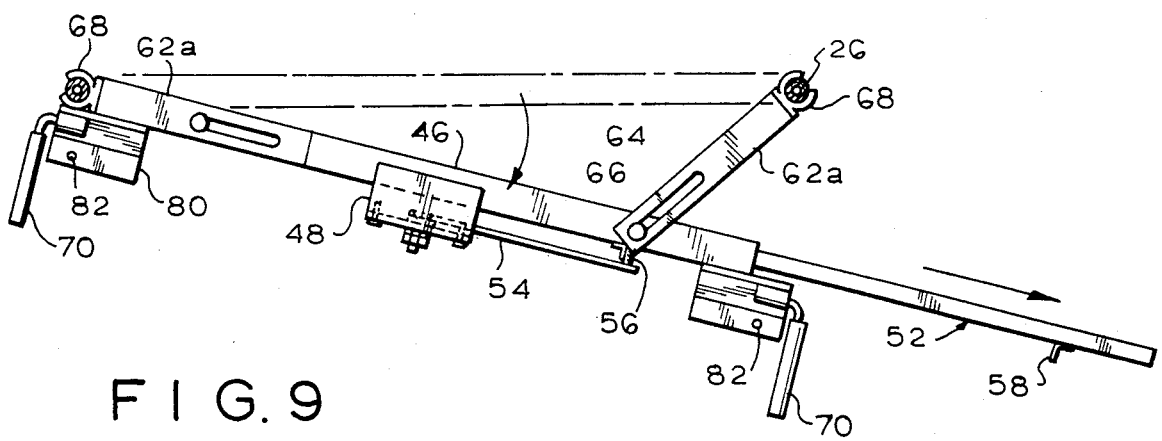
FIG. 9 is an enlarged side elevation view of the cassette holder in a second position with respect to the support members.

The operation of the cassette holder 42 with respect to the stretcher is shown in FIGS. 7-9. In order to load or unload a film cassette, te cable 74 (shown in FIG. 6) side of the stretcher is pulled by the attendant. This retracts the pins 72 secured to the cable from one opposing set of brackets 80 and allows one end of the cassette holder 42 to swing downwardly with respect to the top 12 of the stretcher. Referring to FIG. 7, the cable on the left side of the stretcher has been pulled. The pivot arm 62 on the left side of the cassette holder accordingly pivots about the axis of the left support member 26 as the pivot pins 66 slide down the respective slots 64. The pivot arm 62 will also pivot about the axis defined by the pins 66 as the left side of the cassette holder moves down. The support member 26 on the right side of the stretcher, together with the glide members 68 secured thereto, function as a hinge during this operation.

Once the cassette holder is lowered in the above manner, the attendant may pull the loading tray from the frame 44 as shown in FIG. 8 until the hinge pin 56 abuts one of the angle stop members 58. By reaching under the tray and inserting his fingers through the tray openings 60, a film cassette may be easily removed. A new cassette can then be loaded.

The tray 52 slides back into the frame assembly by pushing thereon. Once within the frame 44, the front edge of the tray is raised. The spring-loaded pins 72 (shown in FIG. 6) automatically compress to allow realignment with the respective bracket openings 82. When the pins are in place, the cassette holder 42 can then be positioned as needed by sliding it along the support members 26. The inside surfaces of the tray are preferably coated with rubber to prevent movement of the cassette during the above procedures.

As shown in FIG. 9, the same functions can be accomplished from the opposite side of the stretcher. The film cassette can also be loaded from the head end if the backrest 14 is elevated.

It will be appreciated that alternative constructions may be employed for pivoting either end of a cassette holder about either support member. The term glide members, for example, is not restricted to the C-shaped nylon members shown and described herein, but may include any structure which allows the cassette holder to pivot about or slide along a support member. The support members do not necessarily have to be tubular in construction unless the glide members are of the type shown in the figures. With respect to the pivot arms, telescoping members may be employed instead of slotted members to allow each end of the cassette holder to move downwardly with respect to the stretcher top.

What is claimed is:

1. A cassette holder for use with a hospital stretcher or the like, comprising:
   a frame;
   a tray slidably mounted to said frame such that it may be moved at least partially outside of said frame in either of two opposing directions;
   a first pivot arm pivotably mounted to said frame;
   first glide means secured to said first pivot arm for slidably and pivotably securing said pivot arm to a support tube;
   a second pivot arm pivotably mounted to said frame; and
   second glide means secured to said second pivot arm for slidably and pivotably securing said pivot arm to a support tube.

2. A cassette holder as defined in claim 1 including means for allowing said first and second glide means to move linearly as well as pivotably with respect to said frame.

3. A cassette holder as defined in claim 2 wherein each of said first and second pivot arms includes a longitudinal slot therein, first and second pivot pins being secured to said frame and extending respectively through said respective longitudinal slots, said first and second pivot arms each being pivotably movable about said respective first and second pivot pins and linearly movable with respect to said frame as said respective first and second pivot pins are moved within said respective longitudinal slots.

4. A cassette holder as defined in claim 1 including stop means for limiting the distance said tray may move in either direction with respect to said frame.

5. A cassette holder as defined in claim 4 wherein said stop means includes a stop member pivotably secured to said frame.

6. A cassette holder as defined in claim 1 including means for maintaining said first and second pivot arms substantially parallel to said frame.

7. A cassette holder as defined in claim 6 wherein said maintaining means includes first and second latch means respectively securing said first and second pivot arms to said frame.

8. A cassette holder as defined in claim 7 wherein said first and second latch meams includes a cable, a pair of spring-loaded pins secured to said cable, first pin receiving means secured to one of said first and second pivot arms, second pin receiving means secured to said frame, each of said pins being positioned within at least one of said first and second pin receiving means.

9. A cassette holder as defined in claim 1 wherein each of said first and second pivot arms is defined by a U-shaped member having a pair of opposing longitudinal slots therein.

10. A patient support apparatus comprising:
    a substantially rectangular frame assembly;
    first and second substantially parallel support members secured to said frame assembly and extending longitudinally therein; and
    a cassette holder including a frame, a tray slidably mounted to said frame, and first and second pivot arms pivotably mounted to opposing sides of said frame, each of said pivot arms being pivotably and slidably mounted to said support members,
    whereby said cassette holder may be pivoted about either said first or second support member.

11. An apparatus as defined in claim 10 including glide means secured to each of said first and second pivot arms, said glide means being slidably and pivotably secured, respectively, to said first and second support members.

12. An apparatus as defined in claim 10 wherein said tray is slidable at least partially outside of said frame in either of two opposing directions.

13. An apparatus as defined in claim 11 including means for allowing said first and second glide means to move linearly as well as pivotably with respect to said frame.

14. An apparatus as defined in claim 13 wherein each of said first and second pivot arms includes a longitudinal slot therein, first and second pivot pins being secured to said frame and extending respectively through said respective longitudinal slots, said first and second pivot arms each being pivotably movable about said respective first and pivot pins and linearly movable as said respective first and second pivot pins are moved within said respective longitudinal slots.

15. An apparatus as defined in claim 10 wherein each of said first and second pivot arms is defined by a U-shaped member having a pair of opposing longitudinal slots therein, first and second pairs of pivot pins being secured to said frame, said first pair of pivot pins extending respectively within one of said pairs of opposing longitudinal slots and said second pair of pivot pins extending respectively within the other of said pairs of opposing longitudinal slots.

16. An apparatus as defined in claim 12 including stop means for limiting the distance said tray may slide in either direction with respect to said frame.

17. An apparatus as defined in claim 16 wherein said stop means includes a stop member pivotably secured to said tray and to said frame.

18. An apparatus as defined in claim 10 including means for maintaining said first and second pivot arms substantially parallel to said frame.

19. An apparatus as defined in claim 18 wherein said maintaining means include first and second latch means respectively securing said first and second pivot arms to said frame.

20. An apparatus as defined in claim 19 wherein said first and second latch means each includes a cable, a pair of spring-loaded pins secured to said cable, first pin receiving means secured to one of said first and second pivot arms, second pin receiving means secured to said frame, each of said pins being positioned within at least one of said first and second pin receiving means.

* * * * *